(12) United States Patent
Koga et al.

(10) Patent No.: US 10,415,949 B2
(45) Date of Patent: Sep. 17, 2019

(54) MEASURING PROBE

(71) Applicant: MITUTOYO CORPORATION, Kanagawa (JP)

(72) Inventors: Satoshi Koga, Ibaraki (JP); Akinori Saito, Ibaraki (JP); Hiroyuki Kanamori, Ibaraki (JP); Yutaka Kuriyama, Ibaraki (JP); Nobuhiro Ishikawa, Ibaraki (JP)

(73) Assignee: MITUTOYO CORPORATION, Kanagawa (JP)

( * ) Notice: Subject to any disclaimer, the term of this patent is extended or adjusted under 35 U.S.C. 154(b) by 277 days.

(21) Appl. No.: 15/440,280

(22) Filed: Feb. 23, 2017

(65) Prior Publication Data

US 2017/0248402 A1 Aug. 31, 2017

(30) Foreign Application Priority Data

Feb. 26, 2016 (JP) .................................. 2016-036473

(51) Int. Cl.
*G01B 7/012* (2006.01)
*G01B 7/00* (2006.01)

(52) U.S. Cl.
CPC .............. *G01B 7/012* (2013.01); *G01B 7/001* (2013.01)

(58) Field of Classification Search
CPC .................................. G01B 7/012; G01B 7/001
(Continued)

(56) References Cited

U.S. PATENT DOCUMENTS 4,158,919 A * 6/1979 McMurtry ............. G01B 7/012
33/505
4,866,854 A * 9/1989 Seltzer ................... B23P 19/105
33/558

(Continued)

FOREIGN PATENT DOCUMENTS

DE 10122200 A1 11/2002
JP H04-178509 6/1992
(Continued)

OTHER PUBLICATIONS

Extended European Search Report for European Application No. 17157601.0-1568 dated Apr. 24, 2017.
(Continued)

*Primary Examiner* — Justin Seo
*Assistant Examiner* — Tania C Courson
(74) *Attorney, Agent, or Firm* — Greenblum & Bernstein, P.L.C.

(57) ABSTRACT

A measuring probe includes two supporting members, each having a rotationally symmetric shape and allowing for an attitude change of a stylus, in an axial direction of a probe housing. Four detection elements are disposed at fourfold symmetric positions in one of the two supporting members that includes four deformable arm parts. A signal processing circuit includes a first processing part that processes outputs of the detection elements to output three displacement signals representing displacement components of a contact part in mutually perpendicular three directions, respectively. The measuring probe capable of reducing measurement directional dependency of sensitivity with a simple configuration while maintaining high sensitivity is thus provided.

12 Claims, 5 Drawing Sheets

(58) Field of Classification Search
USPC .................. 33/502–503, 550–551, 553–554
See application file for complete search history.

(56) References Cited

U.S. PATENT DOCUMENTS

| | | | | |
|---|---|---|---|---|
| 5,210,410 | A * | 5/1993 | Barrett | B82Y 35/00 250/234 |
| 5,228,352 | A * | 7/1993 | McMurtry | G01B 11/007 33/558 |
| 5,345,689 | A | 9/1994 | McMurtry et al. | |
| 5,425,180 | A * | 6/1995 | Breyer | G01B 21/045 33/503 |
| 5,509,211 | A | 4/1996 | Ernst | |
| 5,755,038 | A | 5/1998 | McMurtry | |
| 5,822,877 | A * | 10/1998 | Dai | G01B 7/012 33/560 |
| 5,917,181 | A * | 6/1999 | Yoshizumi | G01B 11/007 250/230 |
| 6,044,569 | A * | 4/2000 | Ogihara | G01B 21/045 33/503 |
| 6,131,301 | A * | 10/2000 | Sutherland | G01B 21/045 33/558 |
| RE37,030 | E * | 1/2001 | Lloyd | G01B 7/002 33/559 |
| 6,327,789 | B1 * | 12/2001 | Nishimura | G01B 7/002 33/558 |
| 6,360,176 | B1 * | 3/2002 | Nishioki | G01B 7/002 702/113 |
| 6,457,366 | B1 * | 10/2002 | Hidaka | G01B 5/012 73/634 |
| 6,516,669 | B2 * | 2/2003 | Matsuki | B23Q 17/20 33/503 |
| 6,675,637 | B2 * | 1/2004 | Saito | B82Y 35/00 73/104 |
| 6,789,327 | B2 * | 9/2004 | Roth | G01B 7/012 33/556 |
| 6,812,850 | B2 * | 11/2004 | Matsumiya | F16P 7/00 33/558 |
| 6,848,315 | B2 * | 2/2005 | Matsuki | G01D 5/2086 33/503 |
| 6,895,359 | B2 * | 5/2005 | Sakurada | G01B 5/012 33/503 |
| 7,076,883 | B2 * | 7/2006 | Yamamoto | F16F 7/10 33/556 |
| 7,490,411 | B2 * | 2/2009 | Matsumiya | G01B 5/204 33/199 R |
| 7,591,078 | B2 * | 9/2009 | Crampton | B25J 13/088 33/503 |
| 7,603,789 | B2 * | 10/2009 | Hellier | G01B 7/012 33/561 |
| 7,784,333 | B2 * | 8/2010 | Nemoto | G01B 3/008 33/503 |
| 7,958,564 | B2 | 6/2011 | Noda et al. | |
| 9,046,335 | B2 * | 6/2015 | Fuchs | G01B 5/008 |
| 9,395,181 | B2 * | 7/2016 | Omori | G01B 21/20 |
| 9,423,232 | B2 * | 8/2016 | Dall'Aglio | G01B 5/016 |
| 9,429,416 | B2 * | 8/2016 | Kocic | G01B 11/005 |
| 9,500,533 | B2 * | 11/2016 | Moersch | G01B 21/04 |
| 9,528,824 | B2 * | 12/2016 | Bos | G01B 21/04 |
| 9,734,609 | B2 * | 8/2017 | Pulla | G01B 21/04 |
| 9,791,262 | B2 * | 10/2017 | Harsila | G01B 1/00 |
| 9,810,529 | B2 * | 11/2017 | Shimaoka | G01B 11/14 |
| 9,989,348 | B2 * | 6/2018 | Desforges | B25J 9/1692 |
| 10,145,666 | B2 * | 12/2018 | Jansson | G01B 5/016 |
| 10,154,822 | B2 * | 12/2018 | Henderson | A61B 6/0457 |
| 2004/0118000 | A1 | 6/2004 | Roth et al. | |
| 2009/0217426 | A1 | 8/2009 | Noda et al. | |
| 2013/0111773 | A1 * | 5/2013 | Fuchs | G01B 5/008 33/503 |
| 2015/0075020 | A1 * | 3/2015 | Mori | G01B 3/008 33/556 |

FOREIGN PATENT DOCUMENTS

| | | |
|---|---|---|
| JP | H05-332766 | 12/1993 |
| JP | H09-507918 A | 8/1997 |
| JP | 10-288502 | 10/1998 |
| JP | 2003-50118 | 2/2003 |
| JP | 2005-181293 | 7/2005 |
| JP | 2007-40822 | 2/2007 |
| JP | U3140476 | 3/2008 |
| JP | 2009-198303 | 9/2009 |
| JP | 2014-115105 | 6/2014 |
| WO | WO96/16312 A | 5/1996 |

OTHER PUBLICATIONS

Extended European Search Report for European Application No. 17157600.2-1568 dated Apr. 24, 2017.
U.S. Appl. No. 15/440,440 to Satoshi Koga et al., filed Feb. 23, 2017.
Office Action issued in Japan Patent Appl. No. JP 2016-036473 dated Jul. 4, 2017, along with an English translation thereof.
Office Action issued in Japan Patent Appl. No. JP 2016-036472 dated Jul. 11, 2017, along with an English translation thereof.

* cited by examiner

MEASURING PROBE

CROSS-REFERENCE TO RELATED APPLICATION

The disclosure of Japanese Patent Application No. 2016-36473 filed on Feb. 26, 2016 including specifications, drawings and claims is incorporated herein by reference in its entirety.

TECHNICAL FIELD

The present invention relates to a measuring probe, and in particular to a measuring probe capable of reducing measurement directional dependency of sensitivity with a simple configuration while maintaining high sensitivity.

BACKGROUND ART

A measuring probe as described in Japanese Translation of PCT International Application Publication No. H09-507918 (hereinafter referred to as Patent Literature 1) has been proposed in conventional techniques. This measuring probe includes: a stylus having a contact part to be in contact with an object to be measured; and detection elements for detecting that the contact part is in contact with the object to be measured. The stylus is supported by two supporting members. One of the supporting members closer to the contact part includes three supporting parts independent of one another, and the detection element is attached to each of the supporting parts. In other words, the measuring probe can output a touch signal with high sensitivity since the stylus is supported by the two supporting members.

SUMMARY OF INVENTION

Technical Problem

In the measuring probe of Patent Literature 1, however, detection signals outputted from the detection elements with respect to a given strain amount unfortunately have directional dependency since the number of the detection elements are three. In other words, even though a sensitivity correction of the touch signal is performed, a correction table is required for such a correction and the measuring probe is thereby complicated. If no correction is made, there is a possibility of being unable to eliminate the directional dependency of sensitivity.

The present invention has been made in order to solve the above-described problems in the conventional techniques, and an object thereof is to provide a measuring probe capable of reducing measurement directional dependency of sensitivity with a simple configuration while maintaining high sensitivity.

Solution to Problem

To solve the above-described problems, a first aspect of the present invention provides a measuring probe including: a stylus having a contact part to be brought into contact with an object to be measured; a probe housing capable of supporting the stylus on an axial center; detection elements capable of detecting a movement of the contact part; and a signal processing circuit that processes outputs of the detection elements. The measuring probe includes a plurality of supporting members in an axial direction of the probe housing, the supporting member having a rotationally symmetric shape and allowing for an attitude change of the stylus. Four said detection elements are disposed at fourfold symmetric positions in at least one of the plurality of supporting members that includes a deformable arm part. The signal processing circuit includes a first processing part that processes the outputs of the detection elements to output three displacement signals representing displacement components of the contact part in mutually perpendicular three directions, respectively.

A second aspect of the present invention provides the above-described measuring probe, wherein the signal processing circuit further includes: a second processing part that outputs a composite signal obtained by combining the three displacement signals; and a comparison part that compares a signal level of the composite signal with a predetermined reference value. The signal processing circuit outputs a touch signal when the signal level of the composite signal is higher than or equal to the predetermined reference value.

A third aspect of the present invention provides the above-described measuring probe, wherein the first processing part includes: a first addition part that adds all of four outputs from the four detection elements; and subtraction parts that subtract, from outputs of two of the detection elements at positions different from each other by an angle of 90 degrees around the axial center, outputs of the detection elements at positions different from the two of the detection elements by an angle of 180 degrees, respectively, and the second processing part include: squaring parts that square the three displacement signals, respectively; and a second addition part that adds all of squared signals outputted from the squaring parts.

A fourth aspect of the present invention provides the above-described measuring probe, wherein the second processing part further includes a square-root operation part that calculates square root of an output of the second addition part to output the composite signal.

A fifth aspect of the present invention provides the above-described measuring probe, wherein the second processing part further includes multiplication parts that multiply signal levels of the three displacement signals by predetermined coefficients, respectively.

A sixth aspect of the present invention provides the above-described measuring probe, wherein the predetermined coefficients are respectively set, when a first reference value and a second reference value are set as the predetermined reference values, so as to calibrate differences among displacement amounts of the contact part in the three directions when the composite signal reaches the second reference value from the first reference value.

A seventh aspect of the present invention provides the above-described measuring probe, wherein a plurality of the styluses is prepared, and the predetermined coefficients are changed for each of the styluses.

An eighth aspect of the present invention provides the above-described measuring probe, wherein the signal processing circuit includes any of a low-pass filter, a high-pass filter, and a band-pass filter in a preceding stage of the comparison part.

A ninth aspect of the present invention provides the above-described measuring probe, wherein the signal processing circuit is configured to output the touch signal, when a certain amount of displacement and a certain amount of measuring force are applied in an arbitrary direction, to the contact part in a reference position that is not applied with the measuring force.

A tenth aspect of the present invention provides the above-described measuring probe, wherein the signal processing circuit is further configured to correct a displacement amount in a direction perpendicular to the axial direction in accordance with a deflection amount of the stylus, when the contact part is applied with a measuring force in the direction perpendicular to the axial direction.

According to the present invention, the measuring probe capable of reducing measurement directional dependency of sensitivity with the simple configuration while maintaining high sensitivity can be obtained. These and other novel features and advantages of the present invention will become apparent from the following detailed description of preferred embodiments.

BRIEF DESCRIPTION OF DRAWINGS

The preferred embodiments will be described with reference to the drawings, wherein like elements have been denoted throughout the figures with like reference numerals, and wherein.

DESCRIPTION OF EMBODIMENTS

An example of an embodiment of the present invention will be described below in detail with reference to the drawings.

The first embodiment of a measuring system of the present invention will be described with reference to FIGS. 1 to 5.

The general configuration of a measuring system 100 will be described first.

Figure 1:
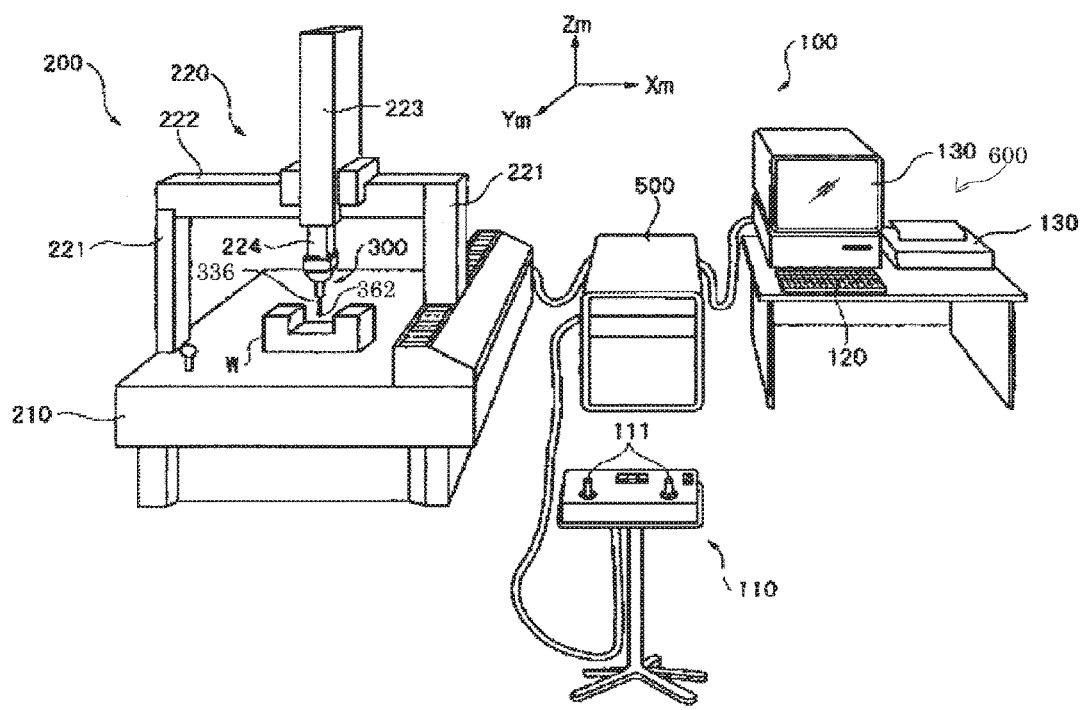
FIG. 1 is a schematic diagram illustrating an example of a measuring system using a measuring probe according to a first embodiment of the present invention.

As illustrated in FIG. 1, the measuring system 100 includes: a coordinate measuring machine 200 that moves a measuring probe 300; an operation part 110 having manually-operated joysticks 111; and a motion controller 500 that controls operations of the coordinate measuring machine 200. The measuring system 100 also includes: a host computer 600 that operates the coordinate measuring machine 200 via the motion controller 500 and processes measured data obtained by the coordinate measuring machine 200 to determine, for example, the dimensions and shape of an object W to be measured; an input unit 120 for inputting, for example, measurement conditions; and an output unit 130 for outputting a result of measurement.

As illustrated in FIG. 1, the coordinate measuring machine 200 includes: the measuring probe 300; a surface plate 210; a drive mechanism 220 provided to stand on the surface plate 210, for three-dimensionally moving the measuring probe 300; and a drive sensor that detects a drive amount of the drive mechanism 220.

The general configuration of the measuring probe 300 will be described next.

Figure 2:
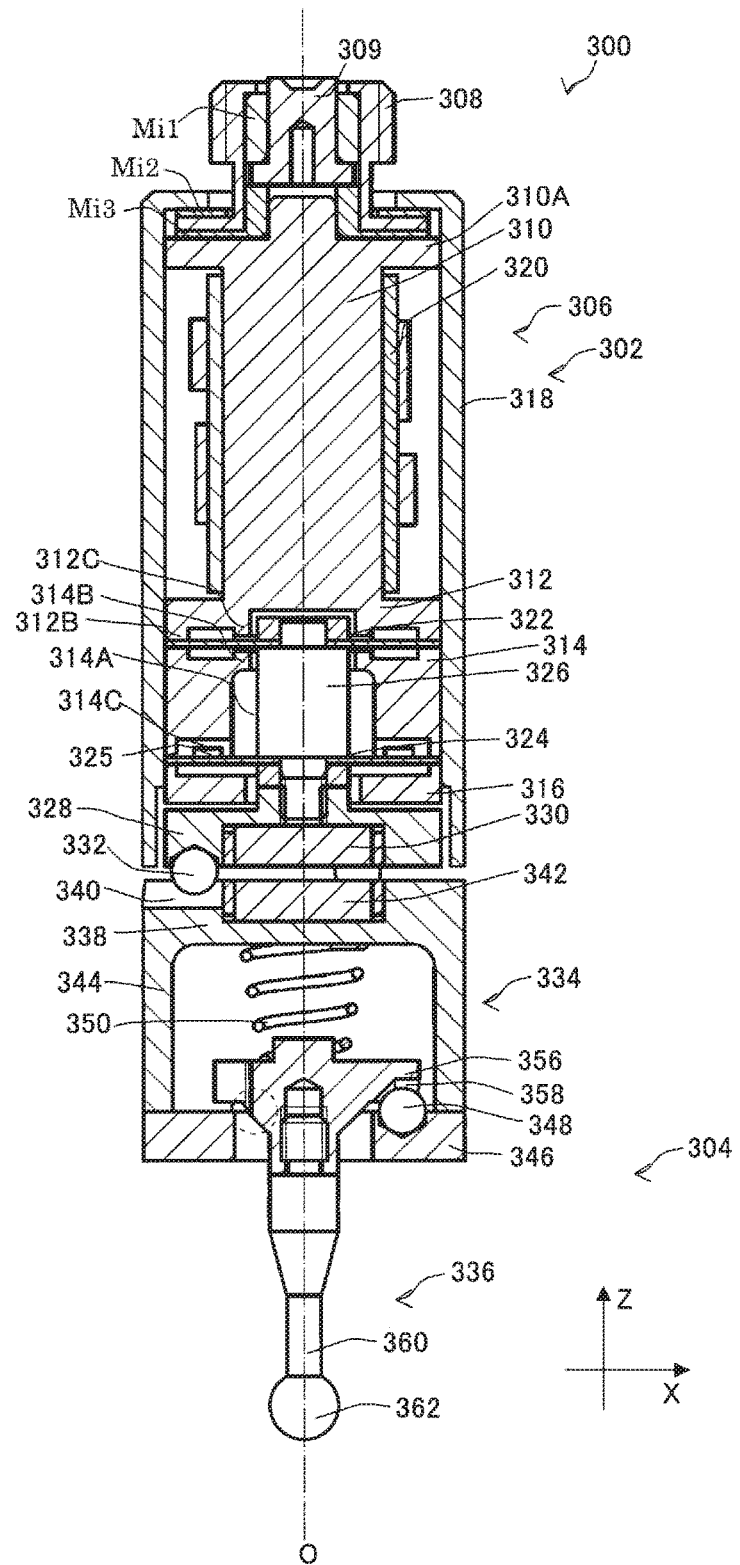
FIG. 2 is a schematic diagram illustrating a cross section of the measuring probe of FIG. 1.

As illustrated in FIG. 2, the measuring probe 300 includes: a stylus 336 having a contact part 362 to be brought into contact with the object W to be measured; a probe housing 306 capable of supporting the stylus 336 on an axial center O; detection elements 325 capable of detecting a movement of the contact part 362 from the axial center O and a movement of the contact part 362 on the axial center O; and a signal processing circuit 320 that processes the outputs of the detection elements 325 to output a touch signal Sout (i.e., the measuring probe 300 is configured as a touch signal probe). Note that the stylus 336 is included in a stylus module 304, and the probe housing 306 and the detection elements 325 are included in a probe main body 302. The probe main body 302 is supported by a spindle 224 of the drive mechanism 220. The stylus module 304 is coupled to the probe main body 302 with a kinematic joint (to be described later) in such a manner that the stylus module 304 can be detached from and attached to the probe main body 302 with high positional reproducibility.

The measuring probe 300 will be described below in detail. Note that the longitudinal direction on the plane of paper in FIG. 2 is defined as a Z direction, the horizontal direction on the plane of paper is defined as an X direction, and the direction perpendicular to the plane of paper is defined as a Y direction for the purpose of the following description. Therefore, the direction of the axial center O of the measuring probe 300 (axial direction O) coincides with the Z direction.

As illustrated in FIG. 2, the probe main body 302 includes the probe housing 306, a signal processing circuit 320, supporting members 322 and 324, the detection elements 325, a coupling shaft 326, a flange member 328, a permanent magnet 330, and balls 332.

As illustrated in FIG. 2, the probe housing 306 includes an attachment part 308, a circuit placement part 310, a fixing member 314, a bottom member (wall member) 316, and a main body cover 318.

As illustrated in FIG. 2, the attachment part 308 is a part to be attached to the spindle 224 at the upper end of the measuring probe 300. The attachment part 308 is provided with, for example, a head to be inserted into a fitting part provided in the spindle 224. The attachment part 308 serves also as one connection terminal capable of electrically connecting to the motion controller 500. The other connection terminal 309 is provided on the axial center O of the attachment part 308. The attachment part 308 and the connection terminal 309 are connected to the signal processing circuit 320 disposed in the circuit placement part 310 without developing a short circuit with each other by insulating members Mi1 to Mi3. The circuit placement part 310 is disposed at the lower end of the attachment part 308. The circuit placement part 310 has a generally triangular cross section, which is perpendicular to the axial center O, except for a disk-shaped upper end part 310A and a disk-shaped lower flange 312 provided at the lower end thereof. The signal processing circuit 320 is disposed along the generally triangular outer periphery of the circuit placement part 310. The circuit placement part 310 is disposed above the supporting members 322 and 324. In other words, the circuit placement part 310 is disposed on the side opposite to the stylus module 304 with respect to the supporting members 322 and 324. This eliminates a need to provide a cavity inside the circuit placement part 310. Thus, the circuit placement part 310 can be shaped with high stiffness. The circuit placement part 310 can be formed from a low-expansion material in order to reduce expansion and contraction due to heat generated from the signal processing circuit 320.

As illustrated in FIG. 2, the fixing member 314 is fixed to a lower end peripheral part 312B of the lower flange 312 via the supporting member 322. The fixing member 314 has a cylindrical shape provided with an opening 314A on the axial center O. Note that facing parts 312C and 314B are provided on the radially inner side of the lower end peripheral part 312B in the lower flange 312 and on the upper end side of the inner circumference of the fixing member 314, respectively. The facing parts 312C and 314B face both surfaces of the supporting member 322 without contact. A distance between the facing parts 312C and 314B and the supporting member 322 is determined so that a displacement of the supporting member 322 is regulated to fall within the range of elastic deformation.

Four recesses 314C are provided on a lower end inner surface of the fixing member 314 with fourfold symmetry. The bottom member 316 is fixed to a lower end peripheral part of the fixing member 314 via the supporting member 324 interposed therebetween. The bottom member 316 has an annular shape. The main body cover 318 has a cylindrical shape. The main body cover 318 is disposed over the outer peripheries of the circuit placement part 310, the lower flange 312, the fixing member 314, and the bottom member 316, so as to cover the whole of the signal processing circuit 320. The main body cover 318 is fixed to the fixing member 314 with bolts.

Figure 4:
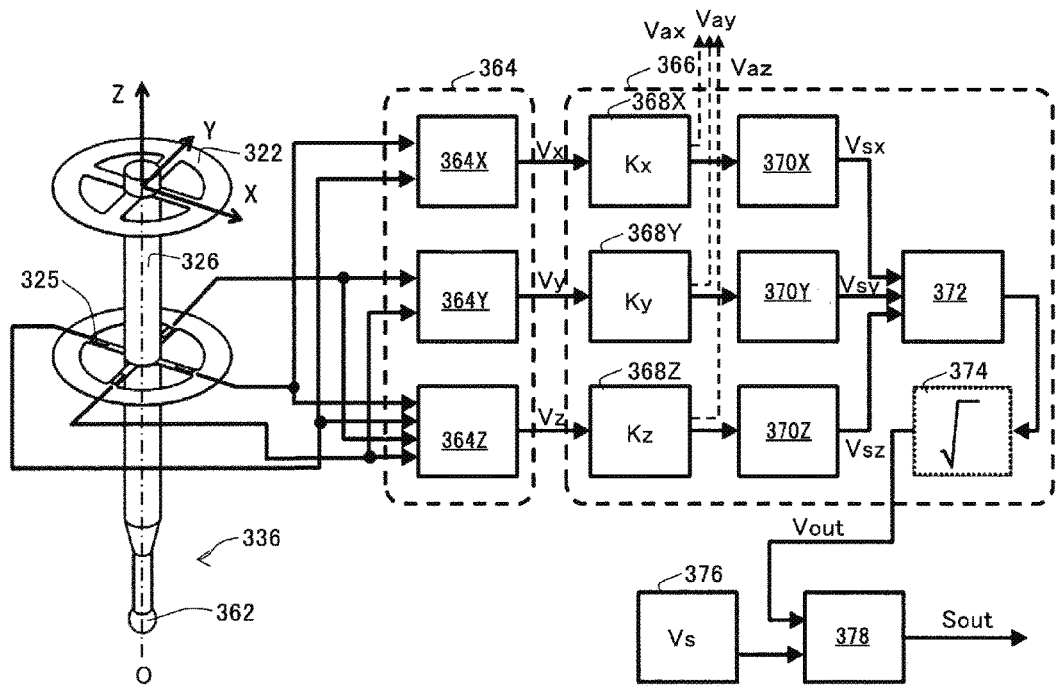
FIG. 4 is a block diagram illustrating a configuration of a signal processing circuit of FIG. 3.

As illustrated in FIG. 4, the signal processing circuit 320 is a circuit that processes the outputs of the detection elements 325 and outputs a touch signal (contact sensed signal) Sout for notifying that the object W to be measured has been in contact with the contact part 362. In brief, the signal processing circuit 320 is configured to obtain deflection amounts in the three X, Y, and Z directions from the outputs of the four detection elements 325, combine the deflection amounts in the three directions, and output the touch signal Sout when the contact part 362 has a certain displacement or greater (the specific configuration will be described later). Note that the signal processing circuit 320 may be provided with a temperature sensor so that a measurement error of the measuring probe 300 generated due to heat is corrected in accordance with the output of the temperature sensor.

Figure 3:
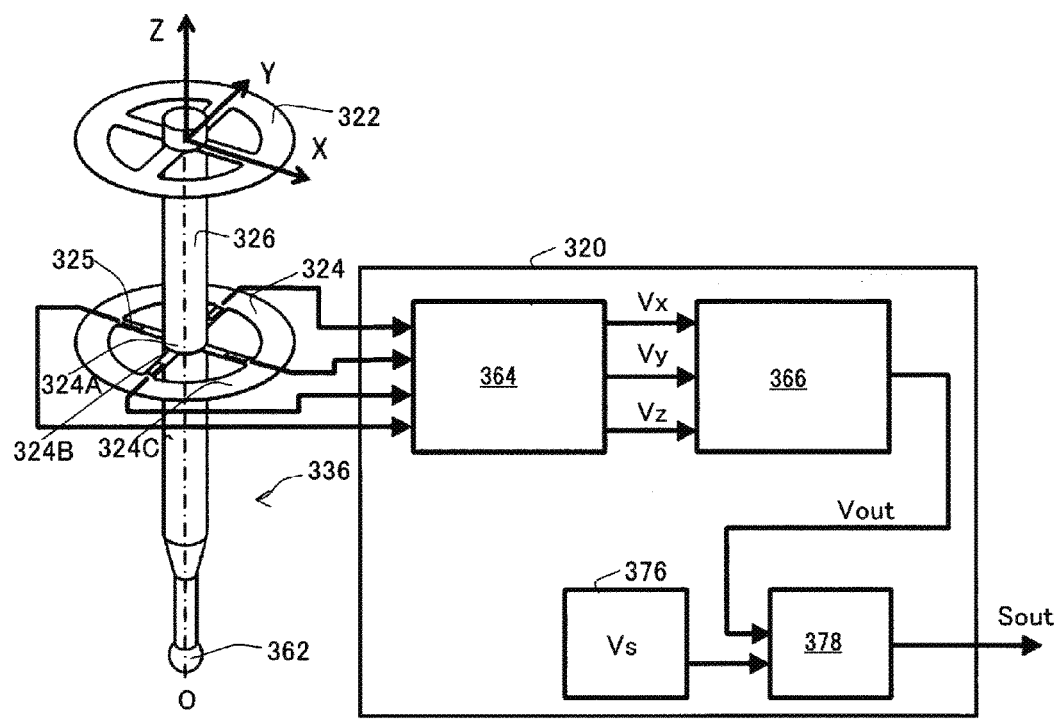
FIG. 3 is a block diagram illustrating a configuration of the measuring probe of FIG. 2.

As illustrated in FIG. 2, the supporting members 322 and 324 are elastically-deformable members disposed in the axial direction O of the probe housing 306 that allow for attitude changes of the stylus 336. A stainless steel material, for example, may be used (other materials may be used) for the supporting members 322 and 324. Specifically, each of the supporting members 322 and 324 has a rotationally symmetric shape including the total of four deformable arm parts at positions shifted from one another by an angle of 90 degrees in the circumferential direction thereof (around the axial center O), as illustrated in FIG. 3. These four arm parts are formed on the same plane. The supporting members 322 and 324 have the same thickness and the same structures except that widths of their arm parts are different from each other (without being limited thereto, the supporting members 322 and 324 may have arm part thicknesses, lengths, and shapes different from each other, or the entire supporting members 322 and 324 may have shapes different from each other). For this reason, the supporting member 324 in which the detection elements 325 are disposed will be described below and a description overlapping with that for the supporting member 322 will be omitted. Note that the structures of the supporting members are not limited to the shapes illustrated in the present embodiment.

As illustrated in FIG. 3, the supporting member 324 is a generally circular plate-shaped member including, in addition to rectangular arm parts 324B, a central part 324A connected to the coupling shaft 326, and a peripheral part 324C coupled to the central part 324A with the arm parts 324B and connected to the probe housing 306. The peripheral part 324C is positioned in the outermost portion of the supporting member 324. The arm parts 324B extend linearly in a radial direction, and are disposed on the inner side of the peripheral part 324C. The central part 324A is disposed on the further inner side of the arm parts 324B. The supporting member 324 is configured such that the central part 324A moves vertically and horizontally by a displacement of the coupling shaft 326 with respect to the probe housing 306 and the arm parts 324B elastically deform accordingly.

As illustrated in FIG. 3, the detection element 325 is an affixed type strain gauge, for example, for detecting a strain amount of the supporting member 324 in which the detection element 325 is disposed. The detection elements 325 are disposed on, and fixed to, for example, with an adhesive, the respective arm parts 324B of the supporting member 324.

As illustrated in FIGS. 2 and 3, the coupling shaft 326 has a generally cylindrical shape and couples the two supporting members 322 and 324 together. The coupling shaft 326 is held on the axial center O by the two supporting members 322 and 324 so as not to be in contact with the lower flange 312, the fixing member 314, and the bottom member 316. The coupling shaft 326 integrally supports the flange member 328.

As illustrated in FIG. 2, the flange member 328 has a generally disk shape. The flange member 328 faces the bottom member 316 in the axial direction O without contact and faces the main body cover 318 in the radial direction without contact. The flange member 328 supports the stylus module 304. Here, a viscous material VM, such as a grease oil, is filled in at least part of a gap between the bottom member 316 and the flange member 328. This allows at least the viscous material VM to damp a displacement of the flange member 328 with respect to the bottom member 316. Thus, the occurrence of unwanted vibrations in the XY direction and the Z direction generated along with a movement of the measuring probe 300 can be reduced, thereby preventing an increase in noise associated with an increase in sensitivity of the measuring probe 300. Note that rubber (an elastic material) such as silicone may be used instead of the viscous material VM. The permanent magnet 330 is fixed to the lower surface of the flange member 328 on the axial center O. The three balls 332 are disposed with rotational symmetry at intervals of 120 degrees in the circumferential direction on a lower end periphery of the flange member 328 so as to surround the permanent magnet 330.

As illustrated in FIG. 2, the aforementioned stylus module 304 includes an over-travel mechanism 334 and the stylus 336 supported by the over-travel mechanism 334.

As illustrated in FIG. 2, the over-travel mechanism 334 is a mechanism that changes the position of the stylus 336 when a force larger than a measuring force F upon outputting the touch signal Sout is applied to the stylus 336 and restores the position of the stylus 336 automatically when such a large force disappears. In other words, the over-travel mechanism 334 works to change the position of the stylus 336 upon the application of a large force to the stylus 336 before the stylus module 304 comes off from the probe main body 302. Specifically, the over-travel mechanism 334 includes a flange part 338, an extended part 344, a stylus holder 346, and a coil spring 350.

As illustrated in FIG. 2, the flange part 338 is a member corresponding to the flange member 328. More specifically, the flange part 338 is provided with three V-grooves 340 at intervals of 120 degrees in the circumferential direction of the flange part 338 so as to be in contact with the balls 332. A magnetic member (which may be a permanent magnet) 342 attracted to the permanent magnet 330 is disposed in the flange part 338 so as to face the permanent magnet 330.

Here, the V-grooves 340 are each to be in contact with the surface of the corresponding ball 332 as illustrated in FIG. 2. Thus, when the permanent magnet 330 and the magnetic member 342 are being attracted to each other by a predetermined magnetic force, the flange part 338 is seated on (in contact with) the flange member 328 at six points. In other words, the flange member 328 and the flange part 338 can be coupled to each other while achieving high positioning accuracy. More specifically, the flange part 338 and the flange member 328 constitute a kinematic joint (referred to also as a kinematic coupling; the same applies hereinafter), which is a coupling mechanism wherein they can be detached from and attached to each other. This kinematic joint allows for the achievement of high positioning reproducibility even when the probe main body 302 and the stylus module 304 are repeatedly detached from and attached to each other. Note that the kinematic joint is not limited to the combination of the V-groove and the ball, but may be a combination of a pair of rollers and a ball. Alternatively, the combination of the V-groove and the ball with the opposite arrangement may be employed. In other words, the kinematic joint is not limited to the combination of the V-groove and the ball as long as the six-point seating can be achieved (the same applies to the following kinematic joint). Note that the stylus module 304 can drop off from the flange member 328 (including not only a case when the balls 332 are not in contact with all of the V-grooves 340 but also a case when only part of the balls 332 is not in contact with the V-grooves 340; the same applies hereinafter) when a large force is applied to the stylus 336 from the lateral direction (the direction perpendicular to the axial direction O), thereby preventing the breakage of the probe main body 302 (thus, the predetermined magnetic force by which the permanent magnet 330 and the magnetic member 342 are attracted to each other is a force corresponding to the aforementioned large force; the same applies hereinafter).

As illustrated in FIG. 2, the extended part 344 is formed integrally with the outer periphery of the flange part 338. The extended part 344 houses the coil spring 350 capable of expanding and contracting in the axial direction O therein. The stylus holder 346 is provided at an end of the extended part 344 in the axial direction O. The stylus holder 346 is connected to the extended part 344 with bolts. The upper surface of the stylus holder 346 closer to the coil spring 350 movably supports the flange part 356 of the stylus 336 pressed by the coil spring 350. Three balls 348 are disposed on the upper surface of the stylus holder 346 closer to the coil spring 350 at intervals of 120 degrees in the circumferential direction thereof. Three V-grooves 358 are provided on the lower surface of the flange part 356 at intervals of 120 degrees in the circumferential direction thereof so as to correspond to the balls 348. Note that an axial direction of the V-groove 358 is approximately the same as the radial direction toward the axial center O. In other words, it can be said that the stylus holder 346 and the flange part 356 constitute the aforementioned kinematic joint.

Thus, when the flange part 356 is being pressed by the coil spring 350 with a predetermined spring force, the flange part 356 is seated on (in contact with) the stylus holder 346 at six points. This allows for positioning at the fixed position. In other words, the over-travel mechanism 334 can achieve the highly-reproducible positioning of the stylus 336 with respect to the flange part 338 within a range of the measuring force F not greater than the pressing force of the coil spring 350. When a force larger than the predetermined spring force given by the coil spring 350 is applied to the stylus 336, the flange part 356 can be removed off from the stylus holder 346, thereby preventing the dropping off of the stylus module 304 from the probe main body 302. While the facing parts 312C and 314B in the present embodiment always allows the supporting member 322 to fall within the range of elastic deformation, the predetermined spring force given by the coil spring 350 is preferably set smaller than the measuring force F exceeding the range of elastic deformation of the supporting members 322 and 324.

As illustrated in FIG. 2, the stylus 336 includes: the flange part 356 supported by the stylus holder 346 as described above; a rod part 360 extending from the flange part 356 in the axial direction O; and the contact part 362 provided at the tip of the rod part 360.

As illustrated in FIG. 2, the base end of the rod part 360 is attached to the flange part 356. The tip of the rod part 360 is provided with the spherical contact part 362 to be brought into contact with the object W to be measured (i.e., the stylus 336 includes the contact part 362 to be brought into contact with the object W to be measured). Note that when no displacement of the stylus 336 in the XY direction occurs, the direction of the central axis of the stylus 336 coincides with the Z direction (the axial direction O).

Next, the signal processing circuit 320 will be described next with reference to FIGS. 3 and 4.

As illustrated in FIG. 3, the signal processing circuit 320 includes a first processing part 364, a second processing part 366, a reference value setting part 376, and a comparison part 378.

As illustrated in FIG. 3, the first processing part 364 processes the outputs of the detection elements 325 to output three displacement signals Vx, Vy, and Vz representing displacement components of the contact part 362 in the mutually perpendicular three X, Y, and Z directions, respectively. Specifically, the first processing part 364 includes subtraction parts 364X and 364Y and an addition part (first addition part) 364Z, as illustrated in FIG. 4. From the outputs of the two detection elements 325 at positions different from each other by an angle of 90 degrees around the axial center O, the subtraction parts 364X and 364Y subtract (calculate a difference) the outputs of the detection elements 325 at positions different from the aforementioned two detection elements 325 by an angle of 180 degrees (in the X direction and in the Y direction), respectively. The subtraction parts 364X and 364Y then output the displacement signals Vx and Vy, respectively. The addition part 364Z adds all of the four outputs from the four detection elements 325. The addition part 364Z then outputs the displacement signal Vz.

As illustrated in FIG. 3, the second processing part 366 outputs a composite signal Vout obtained by combining the three displacement signals Vx, Vy, and Vz. Specifically, the second processing part 366 includes: three multiplication parts 368X, 368Y, and 368Z; three squaring parts 370X, 370Y, and 370Z; an addition part (second addition part) 372; and a square-root operation part 374, as illustrated in FIG. 4. The three multiplication parts 368X, 368Y, and 368Z multiply the signal levels of the displacement signals Vx, Vy, and Vz by predetermined coefficients Kx, Ky, and Kz, respectively, to change the signal levels of the displacement signals Vx, Vy, and Vz relative to one another. Here, the predetermined coefficients Kx, Ky, and Kz are set, when a first reference value Vs1 and a second reference value Vs2 are respectively set as predetermined reference values Vs, so as to calibrate differences among the displacement amounts of the contact part 362 in the three X, Y, and Z directions when the composite signal Vout reaches the second reference value Vs2 from the first reference value Vs1. In other words, this calibration makes the amounts of displacement of the contact part 362 identical with one another in the three X, Y, and Z directions when the composite signal Vout is changed from the first reference value Vs1 to the second reference value Vs2. Note that all of the predetermined coefficients Kx, Ky, and Kz may be the same, two of the predetermined coefficients Kx, Ky, and Kz may be the same, or the predetermined coefficients Kx, Ky, and Kz may be different from one another.

Figure 5:
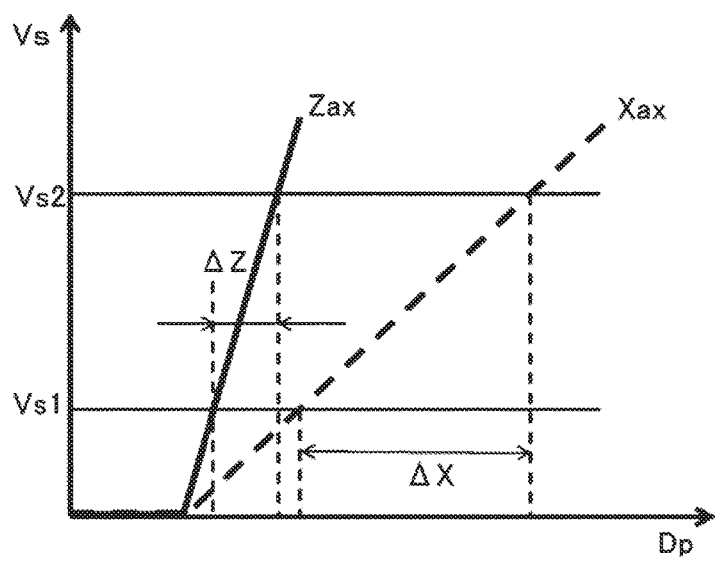
FIG. 5 is a schematic diagram illustrating a relationship between coefficients in multiplication parts of FIG. 4.

Specifically, the relation between the X direction and the Z direction of the contact part 362 for the predetermined coefficients Kx, Kz will be described with reference to FIG. 5 (a description about the Y direction will be omitted because of its similarity to the X direction). In FIG. 5, the vertical axis represents the predetermined reference value Vs, and the horizontal axis represents a displacement Dp of the contact part 362. FIG. 5 is a graph with a solid line Zax showing a displacement of the contact part 362 in the Z direction and with a broken line Xax showing a displacement of the contact part 362 in the X direction. For example, a Z-direction displacement amount ΔZ and an X-direction displacement amount ΔX of the contact part 362 from the first reference value Vs1 to the second reference value Vs2, and the predetermined coefficients Kz and Kx satisfy the relationship as expressed by Expression (1).

$$Kz/Kx = \Delta Z/\Delta X \quad (1)$$

Note that a plurality of styluses 336, which can be detached from and attached to the stylus module 304, are prepared, and the predetermined coefficients Kx, Ky, and Kz are changed for each of the styluses 336. The predetermined coefficients Kx, Ky, and Kz are obtained when a reference sphere (may be not a reference sphere but the object W to be measured itself) provided on the surface plate 210 is measured by the measuring probe 300, for example. The predetermined coefficients Kx, Ky, and Kz are then stored in a storage part (the storage part may be provided in the signal processing circuit 320, the motion controller 500, or the host computer 600). Needless to say, the predetermined coefficients Kx, Ky, and Kz may be stored in the storage part before measuring the reference sphere.

As illustrated in FIG. 4, the three squaring parts 370X, 370Y, and 370Z square the outputs (corresponding to displacement output signals Vax, Vay, and Vaz) of the three multiplication parts 368X, 368Y, and 368Z, respectively. The addition part 372 adds all of squared signals Vsx, Vsy, and Vsz outputted from the squaring parts 370X, 370Y, and 370Z. Thereafter, the square-root operation part 374 calculates the square root of the output of the addition part 372 to output the composite signal Vout.

As illustrated in FIG. 3, the reference value setting part 376 is a part that sets the predetermined reference value Vs. For example, the predetermined reference value Vs may be set via the input unit 120, or may be set on the basis of a value stored in the storage part of the host computer 600.

As illustrated in FIG. 3, the comparison part 378 compares the signal level of the composite signal Vout with the predetermined reference value Vs, binarizes the comparison result of the composite signal Vout, and outputs the binarized value. More specifically, the comparison part 378 outputs the touch signal Sout, which is a HIGH signal, when the signal level of the composite signal Vout is higher than or equal to the predetermined reference value Vs. Note that the circuit for the signal processing up to the composite signal Vout may be either an analog signal processing circuit or a digital signal processing circuit.

As described above, since the detection elements 325 are disposed with fourfold symmetry in the present embodiment, the outputs of the detection elements 325 disposed on the arm parts 324B can be easily calculated into displacement components in the three X, Y, and Z directions. At the same time, measurement sensitivity can be made isotropic around the axial center O. Note that the present invention is not limited thereto. The arm part may have an integral circular plate shape without being separated into four. Alternatively, a supporting member with a rotationally symmetric shape including arm parts in a multiple of four (for example, eight arm parts without being limited to four) may be employed. Alternatively, not two but three or more supporting members may be employed. Note that the supporting member without the detection elements does not necessarily need to include the arm parts in a multiple of four. Alternatively, two or more supporting members, each supporting the detection elements, may be employed.

Specifically, the first processing part 364 includes the subtraction parts 364X and 364Y and the addition part 364Z, and the second processing part 366 includes the squaring parts 370X, 370Y, and 370Z and the addition part 372 in the present embodiment. This allows the signal processing circuit 320 to output the touch signal Sout with the simple configuration. Without being limited thereto, the first processing part and the second processing part may have different configurations.

In the present embodiment, the second processing part 366 further includes the square-root operation part 374. Consequently, the predetermined reference value Vs in the comparison part 378 can be assumed to be in the same dimension as the displacement amounts of the contact part 362. Thus, the predetermined reference value Vs can be set easily. Without being limited thereto, no square-root operation part may be provided.

In the present embodiment, the second processing part 366 further includes the multiplication parts 368X, 368Y, and 368Z. This can reduce the directional dependency of the displacement amounts of the contact part 362 when the touch signal Sout is outputted. Thus, isotropic sensitivity can be achieved in the three X, Y, and Z directions. Note that the present invention is not limited thereto. Only part of the multiplication parts may be provided or no multiplication parts may be provided. The multiplication parts may not necessarily achieve isotropic sensitivity in the three X, Y, and Z directions.

Furthermore, the predetermined coefficients Kx, Ky, and Kz are set in the present embodiment, when the first reference value Vs1 and the second reference value Vs2 are respectively set as the predetermined reference values Vs, so as to calibrate differences among the displacement amounts of the contact part 362 in the three X, Y, and Z directions when the composite signal Vout reaches the second reference value Vs2 from the first reference value Vs1. Thus, the use of such predetermined coefficients Kx, Ky, and Kz allows the touch signal Sout to be outputted with a constant displacement amount in all of the three X, Y, and Z directions. Without being limited thereto, the predetermined coefficients Kx, Ky, and Kz may be determined by a different method.

In the present embodiment, the plurality of styluses 336 is prepared, and the predetermined coefficients Kx, Ky, and Kz are changed for each of the styluses 336. Thus, when a different stylus 336 (including its length) is used, the characteristics thereof can be corrected, thereby allowing for measurement with high sensitivity. Note that the present invention is not limited thereto. The predetermined coefficients Kx, Ky, and Kz may not necessarily be changed even when a plurality of styluses is prepared.

In the present embodiment, the detection element 325 is an affixed type strain gauge. In other words, a highly-sensitive and low-cost detection element can be used as the detection element 325. Moreover, the position at which the detection element 325 is affixed can be easily adjusted. The detection element 325 does not detect a transient impact force only but can send an output corresponding to the deflection amount stably for a certain period of time. This can eliminate a need to provide a circuit for performing delay time adjustments even if output timing for the deflection amounts in the three X, Y, and Z directions is shifted from one another in the detection elements 325. Without being limited thereto, the detection element may be a strain gauge or PZT, for example, formed on the arm part by means of direct deposition, for example.

In other words, according to the present embodiment, the measurement directional dependency of sensitivity can be reduced with the simple configuration while maintaining high sensitivity.

While the present invention has been described taking the first embodiment as an example, the present invention is not limited to the first embodiment. In other words, modifications and design alterations are obviously possible without departing from the scope of the present invention.

For example, the output of the second processing part 366 is directly compared with the predetermined reference value Vs in the comparison part 378 in the first embodiment. However, the present invention is not limited thereto. For example, the present invention may be configured as in the second embodiment illustrated in FIG. 6. The second embodiment is different from the first embodiment only in that a filter part is provided between a second processing part and a comparison part in a signal processing circuit. Accordingly, only the first digit of the reference numerals of elements excluding those relating to the filter part is basically changed and the description about those elements will be omitted.

Figure 6:
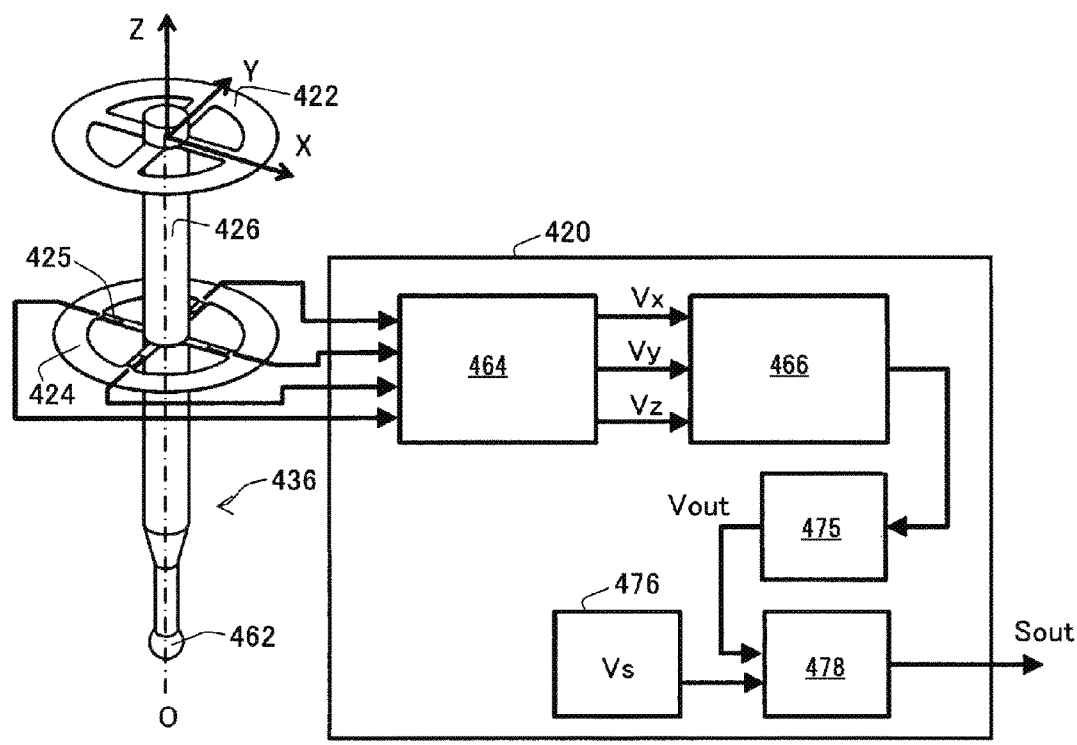
FIG. 6 is a block diagram illustrating a configuration of a measuring probe according to a second embodiment of the present invention.

As illustrated in FIG. 6, a signal processing circuit 420 includes a filter part 475 in the second embodiment. A low-pass filter, a high-pass filter, or a band-pass filter may be set in the filter part 475. The low-pass filter can effectively eliminate the effects of noise due to disturbance vibration, electrical noise, and probe vibration due to the movement of the probe. The high-pass filter can eliminate an effect such as the one which causes the output of a detection element 425 to fluctuate gently due to an influence of temperature, for example, and the effect of noise close to a DC component generated by the attitude (for example, horizontal attitude) of the measuring probe 300. The band-pass filter can eliminate the effects of the aforementioned ranges. The filter part is not limited thereto as long as the filter part is provided in the preceding stage of the comparison part.

In the first embodiment, such a correction as to eliminate the directional dependency can be made when the touch signal Sout is outputted. However, no particular consideration is made for the directional dependency of the measuring force F upon outputting the touch signal Sout. In view of this, the signal processing circuit may be configured, for example, to output the touch signal Sout, when a certain amount of displacement and a certain amount of measuring force F are applied in an arbitrary direction, to the contact part in the reference position that is not applied with the measuring force F. In such a case, the force sensitivity of the contact part can be made uniform in all directions, thus allowing for an increase in measurement accuracy. A correction coefficient for such a purpose may be obtained, for example, when the reference sphere provided on the surface plate is measured by the measuring probe, and may be stored in the storage part (the storage part may be provided in the signal processing circuit, the motion controller, or the host computer). Needless to say, such a correction coefficient may be stored in the storage part before measuring the reference sphere.

In the first embodiment, no consideration is made for a case in which the axis of the stylus 336 and the axis of the coupling shaft 326 do not overlap each other on the same straight line even when the touch signal Sout is outputted. In other words, no bend of the stylus 336 is taken into consideration. However, the present invention is not limited thereto. For example, the signal processing circuit may be configured to correct a displacement amount in the direction perpendicular to the axial direction O in accordance with a deflection amount of the stylus, when the contact part is applied with the measuring force F in the direction perpendicular to the axial direction O. In this case, the deflection amount under the application of the measuring force F can also be corrected in the measuring probe. Consequently, the touch signal Sout can be outputted with smaller directional dependency. The correction coefficient for such a purpose can be similarly obtained, for example, when the reference sphere provided on the surface plate is measured by the measuring probe, and may be stored in the storage part (the storage part may be provided in the signal processing circuit, the motion controller, or the host computer). Needless to say, such a correction coefficient may be stored in the storage part before measuring the reference sphere (it may be the object W to be measured itself).

While the signal processing circuit includes the first processing part and the second processing part in the above-described embodiment, the present invention is not limited thereto. For example, without providing the second processing part in the signal processing circuit, the displacement signals Vx, Vy, and Vz, which are the outputs of the first processing part, may be directly outputted from the signal processing circuit. In other words, the measuring probe may be not the touch signal probe described in the above-described embodiment but a scanning probe. Even when the measuring probe is configured as a scanning probe, only the multiplication parts of the second processing part may be provided and the displacement output signals Vax, Vay, and Vaz may be outputted from the signal processing circuit. Alternatively, even when the measuring probe is configured as a touch signal probe, the touch signal Sout and the displacement output signals Vax, Vay, and Vaz indicated by broken lines may be outputted from the signal processing circuit as in FIG. 4 illustrating the above-described embodiment.

The present invention can be applied to a wide range of measuring probes used for measuring three-dimensional shapes of objects to be measured. In doing so, the present invention can be applied not only to measuring probes for coordinate measuring machines but also to measuring probes used in machine tools.

It should be apparent to those skilled in the art that the above-described embodiments are merely illustrative which represent the application of the principles of the present invention. Numerous and varied other arrangements can be readily devised by those skilled in the art without departing from the spirit and the scope of the present invention.

What is claimed is:

1. A measuring probe comprising:
   a stylus having a contact part to be brought into contact with an object to be measured;
   a probe housing that supports the stylus on an axial center;
   a plurality of strain gauges that detect a movement of the contact part;
   a signal processing circuit that processes outputs of the strain gauges; and
   a plurality of supporting members disposed in an axial direction of the probe housing, each of the supporting members having a rotationally symmetric shape and configured to allow an attitude change of the stylus, wherein
   four of the strain gauges are disposed at fourfold symmetric positions in at least one of the plurality of supporting members that includes a deformable arm, and
   the signal processing circuit processes the outputs of the strain gauges to output three displacement signals representing displacement components of the contact part in mutually perpendicular three directions, respectively.

2. The measuring probe according to claim 1, wherein the signal processing circuit further
   outputs a composite signal obtained by combining the three displacement signals;
   compares a signal level of the composite signal with a predetermined reference value; and
   outputs a touch signal when the signal level of the composite signal is higher than or equal to the predetermined reference value.

3. The measuring probe according to claim 2, wherein the signal processing circuit further
   adds all of four outputs from the four strain gauges;
   subtracts, from outputs of two of the strain gauges at positions different from each other by an angle of 90 degrees around the axial center, outputs of the strain gauges at positions different from the two of the strain gauges by an angle of 180 degrees, respectively;
   squares the three displacement signals to provide squared signals; and
   adds all of the squared signals to provide a sum of the squared signals.

4. The measuring probe according to claim 3, wherein the signal processing circuit further calculates a square root of the sum of the squared signals to output the composite signal.

5. The measuring probe according to claim 2, wherein the signal processing circuit further multiplies signal levels of the three displacement signals by predetermined coefficients, respectively.

6. The measuring probe according to claim 5, wherein, when a first reference value and a second reference value are set as the predetermined reference values, the predetermined coefficients are respectively set to calibrate differences among displacement amounts of the contact part in the three directions when the composite signal reaches the second reference value from the first reference value.

7. The measuring probe according to claim 6, wherein, when a plurality of the styluses is provided, the predetermined coefficients are changed for each of the styluses.

8. The measuring probe according to claim 2, wherein the signal processing circuit includes any of a low-pass filter, a high-pass filter, and a band-pass filter.

9. The measuring probe according to claim 2, wherein, when a certain amount of displacement and a certain amount of measuring force are applied in an arbitrary direction, the signal processing circuit outputs the touch signal to the contact part in a reference position that is not applied with the measuring force.

10. The measuring probe according to claim 1, wherein, when the contact part is applied with a measuring force in the direction perpendicular to the axial direction, the signal processing circuit corrects a displacement amount in a direction perpendicular to the axial direction in accordance with a deflection amount of the stylus.

11. The measuring probe according to claim 1, wherein each of the plurality of supporting members is spaced from one another, such that the plurality of supporting members are disposed at different positions with respect to the probe housing.

12. The measuring probe according to claim 1, wherein the strain gauges are positioned on a surface of one of the supporting members, the surface being on a plane perpendicular to the axial direction of the probe housing.

* * * * *